United States Patent Office.

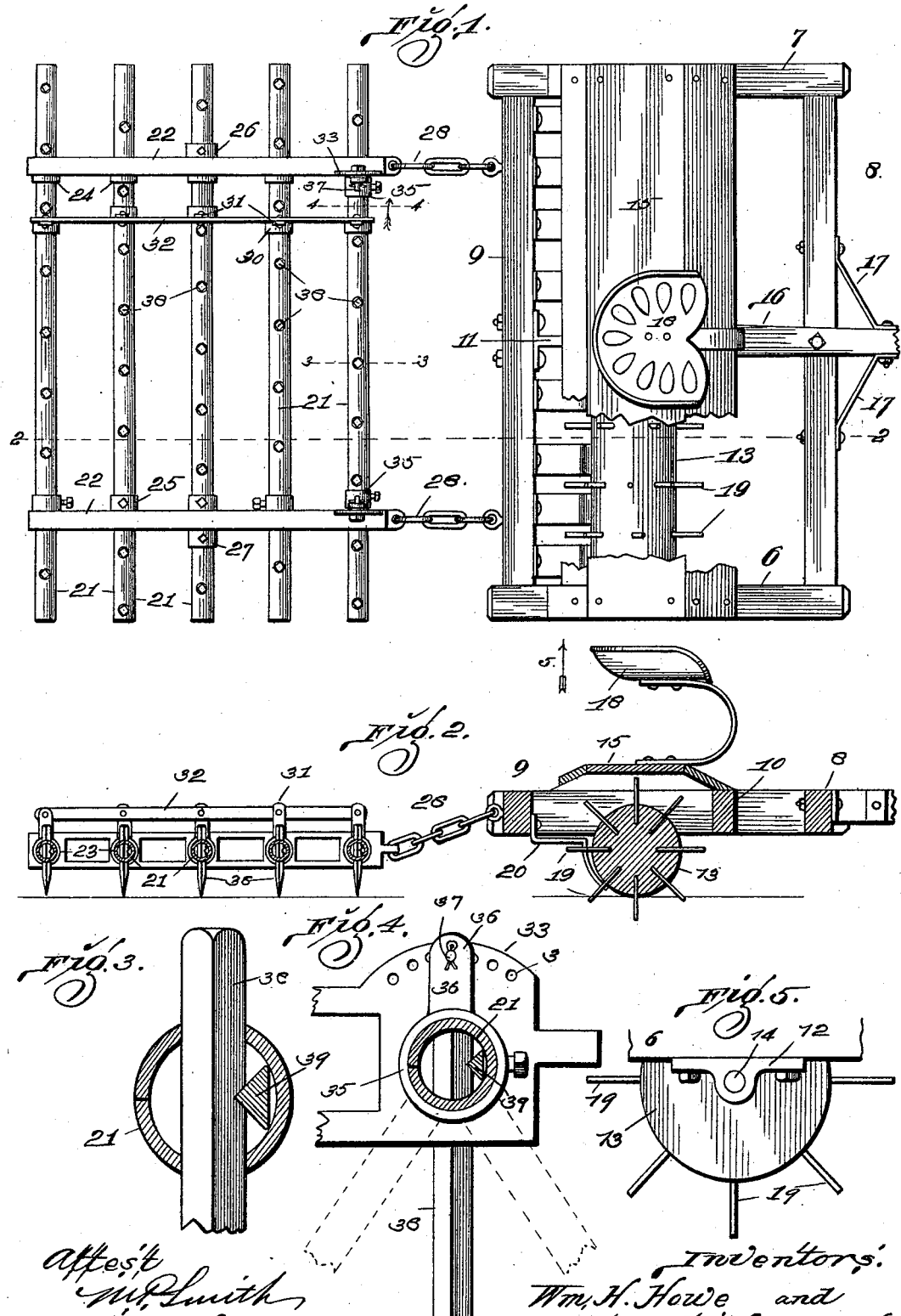

WILLIAM H. HOWE AND PETER STIEFERMAN, OF KLIEVER, MISSOURI.

PULVERIZER.

SPECIFICATION forming part of Letters Patent No. 602,329, dated April 12, 1898.

Application filed September 28, 1897. Serial No. 653,405. (No model.)

*To all whom it may concern:*

Be it known that we, WILLIAM H. HOWE and PETER STIEFERMAN, of the city of Kliever, Moniteau county, State of Missouri, have invented certain new and useful Improvements in Pulverizers, of which the following is a full, clear, and exact description, reference being had to the accompanying drawings, forming a part hereof.

Our invention relates to pulverizers; and it consists of the novel construction, combination, and arrangement of parts hereinafter shown, described, and claimed.

Figure 1 is a plan view of our improved pulverizer, parts being broken away to economize space and other parts being broken away to illustrate the construction. Fig. 2 is a vertical section taken approximately on the line 2 2 of Fig. 1. Fig. 3 is a sectional detail taken approximately on the line 3 3 of Fig. 1. Fig. 4 is a sectional detail taken approximately on the line 4 4 of Fig. 1 and looking in the direction indicated by the arrow. Fig. 5 is a side elevation of the part seen looking in the direction indicated by the arrow 5 in Fig. 1.

Referring by numerals to the drawings, the side pieces 6 and 7 are connected by the cross-pieces 8 and 9, thus forming a rectangular frame. A timber 10 is inserted between the side pieces 6 and 7 and between the cross-pieces 8 and 9, said timber being located somewhat nearer to the cross-piece 8 than to the cross-piece 9. A bar 11 connects the centers of the cross-piece 9 and the timber 10, said bar being parallel with and half-way between the side pieces 6 and 7. Bearing-blocks 12 are attached to the lower faces of the side pieces 6 and 7, and a bearing is formed in the bar 11 in alinement with said bearing-blocks 12.

A roller 13 is mounted between the side piece 6 and the bar 11, with its spindles 14 operating one in the bearing-block 12 and the other in the bearing in the bar 11. A roller, similar in every respect to the roller 13, is mounted between the side piece 7 and the bar 11, and said rollers are covered by means of the boards 15, extending from the side piece 6 to the side piece 7. A tongue 16 is attached to the cross-piece 8 and the timber 10 and extends forwardly, and the braces 17 are attached to the tongue and the cross-piece 8.

The seat 18 is attached to the boards 15 in alinement with the rear end of the tongue 16.

The pins 19 are inserted into the rollers and project radially from the peripheries of the rollers, said pins being arranged in lines around the rollers. The scrapers 20 are attached to the cross-piece 9 and extend forwardly and downwardly and between the lines of pins 19 and into close relation with the peripheries of the rollers, as required to prevent mud and loam from being carried around the rollers.

The pipes 21 are connected by means of the bars 22, said bars 22 having bearings 23, through which the pipes are rotatably mounted. The collars 24 are fixed upon the pipes inside of one of the bars 22, and the collars 25 are mounted upon the pipes by means of set-screws and located inside of the other one of the bars 22. A set-collar 26 holds the bar 22 against the collars 24, and a similar set-collar 27 holds the other bar 22 against the collars 25. Chains 28 are attached to the front ends of the bars 22 and are in turn attached to the cross-piece 9. The collars 30 are fixed upon the pipes 21, and arms 31 extend upwardly from said collars. The upper ends of the arms 31 are pivotally connected by means of the bar 32, as required to cause all the pipes 21 to rotate or rock simultaneously. Segmental plates 33 extend upwardly from the forward ends of the bars 22, and a series of holes 34 is formed in the upper edge of the plates, said holes being arranged in a line of a segment relative to the forward one of the pipes 21. Collars 35 are fixed upon the forward one of the pipes 21 by means of set-screws, and arms 36 extend upwardly from said collars and adjacent to the plates 33. The bolts 37 are removably inserted through the upper ends of the arms 36 into the desired ones of the apertures 34, as required to hold the pipes 21 from rotating or rocking in the bearings in the bars 22 and as required to adjust said pipes to the desired position. The teeth 38 are inserted downwardly through the pipes 21 suitable distances apart, and the triangular bars 39 are inserted longitudinally through the pipes, one edge of each of said bars engaging in triangular notches in the teeth 38, as required to hold the teeth securely in position relative to the pipes. The teeth 38 are adjusted simultaneously relative to a vertical line by means of the bolts 37. The pipe 21, the bar 22, the teeth 38, and the means of adjusting the teeth constitute a drag, which drag follows the rollers by being attached to the cross-piece 9.

The operation is obvious.

We claim—

In a pulverizer, a pair of bars provided with horizontally-alined bearings, pipes rotatably mounted in said bearings, set-collars located upon said pipes to prevent their lateral movement, harrow-teeth passing vertically through said pipes, in which harrow-teeth are formed notches, triangular bars passing through said pipes and engaging in the notches of the harrow-teeth, collars fixed upon all of the pipes, fingers extending upwardly from each of said collars, a bar connecting the upper ends of all fingers, and means for rotating the forward one of said pipes and locking it after being rotated to the desired position substantially as specified.

In testimony whereof we affix our signatures in presence of two witnesses.

WILLIAM H. HOWE.
PETER STIEFERMAN.

Witnesses:
  D. B. BAXTER,
  R. M. EMBRY.